United States Patent
Simon et al.

(10) Patent No.: US 11,556,431 B2
(45) Date of Patent: Jan. 17, 2023

(54) ROLLBACK RECOVERY WITH DATA LINEAGE CAPTURE FOR DATA PIPELINES

(71) Applicant: SAP SE, Walldorf (DE)

(72) Inventors: Eric Simon, Juvisy (FR); Cesar Salgado Vieira de Souza, Porto Alegre (BR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/236,505

(22) Filed: Apr. 21, 2021

(65) Prior Publication Data

US 2022/0365851 A1    Nov. 17, 2022

(51) Int. Cl.
*G06F 11/14* (2006.01)
*G06F 12/02* (2006.01)

(52) U.S. Cl.
CPC ...... *G06F 11/1469* (2013.01); *G06F 12/0253* (2013.01); *G06F 2201/84* (2013.01); *G06F 2212/702* (2013.01)

(58) Field of Classification Search
CPC ............. G06F 11/1469; G06F 12/0253; G06F 2201/84; G06F 2212/702; G06F 2201/86
See application file for complete search history.

(56) References Cited

U.S. PATENT DOCUMENTS

| | | | | |
|---|---|---|---|---|
| 6,182,086 B1* | 1/2001 | Lomet | ................. | G06F 11/1471 |
| 6,212,653 B1* | 4/2001 | Boivin | ................ | G06F 11/0715 |
| | | | | 714/39 |
| 6,990,466 B1* | 1/2006 | Hu | ....................... | G06Q 20/102 |
| | | | | 705/40 |
| 7,100,195 B1* | 8/2006 | Underwood | ........ | H04L 63/0823 |
| | | | | 707/999.009 |
| 7,301,463 B1* | 11/2007 | Paterno | .................. | G16H 40/67 |
| | | | | 340/522 |
| 7,818,757 B1 | 10/2010 | Tsimelzon et al. | | |

(Continued)

OTHER PUBLICATIONS

Elnozahy, E.N. (Mootaz) et al., A Survey of Rollback-Recovery Protocols in Message-Passing Systems, published 2002.

(Continued)

*Primary Examiner* — Merilyn P Nguyen
(74) *Attorney, Agent, or Firm* — Fountainhead Law Group P.C.

(57) ABSTRACT

Computer-readable media, methods, and systems are disclosed for performing rollback recovery with data lineage capture for data pipelines. A middle operator receives ingested input events from a source operator reading data from an external input data source. The middle operator then logs information regarding middle input events to a middle operator input log, designating the logged middle input event information as incomplete. The middle operator then processes data associated with the middle input events and updates the middle input log entries setting them to a completed logging status designation for middle input events that were consumed to produce the one or more middle output events. The middle operator then transmits the middle output events to subsequent operators. Garbage collection is performed to remove completed entries from the middle operator output log. Finally, based on receiving a recovering message from a subsequent operator, corresponding middle output events are re-sent.

20 Claims, 8 Drawing Sheets

(56) References Cited

U.S. PATENT DOCUMENTS

| | | | | |
|---|---|---|---|---|
| 8,676,635 | B2* | 3/2014 | Giacomello | G06F 9/52 |
| | | | | 700/71 |
| 9,398,077 | B2* | 7/2016 | Bosworth | G06F 12/0875 |
| 9,645,224 | B2* | 5/2017 | Abraham | G01S 5/0027 |
| 9,779,104 | B2* | 10/2017 | Andrei | G06F 11/1402 |
| 2003/0140253 | A1* | 7/2003 | Crosbie | G06F 21/554 |
| | | | | 726/28 |
| 2007/0016429 | A1* | 1/2007 | Bournas | G06Q 10/06 |
| | | | | 700/91 |
| 2007/0174815 | A1* | 7/2007 | Chrysanthakopoulos | |
| | | | | H04L 67/02 |
| | | | | 717/120 |
| 2011/0225229 | A1* | 9/2011 | Srivastava | G06Q 50/00 |
| | | | | 709/206 |
| 2012/0109895 | A1* | 5/2012 | Zwilling | G06F 16/2308 |
| | | | | 707/648 |
| 2015/0378870 | A1* | 12/2015 | Marron | G06F 11/362 |
| | | | | 717/128 |
| 2016/0179630 | A1 | 6/2016 | Halberstadt et al. | |
| 2016/0344834 | A1* | 11/2016 | Das | H04L 67/1097 |
| 2017/0116210 | A1 | 4/2017 | Park et al. | |
| 2017/0147628 | A1* | 5/2017 | Park | G06F 16/2365 |
| 2017/0192863 | A1* | 7/2017 | Eluri | G06F 16/27 |
| 2017/0250855 | A1* | 8/2017 | Patil | H04L 47/827 |
| 2019/0065692 | A1* | 2/2019 | Connelly | G16H 50/30 |
| 2020/0126037 | A1* | 4/2020 | Tatituri | G06Q 10/0875 |
| 2020/0349049 | A1* | 11/2020 | Krebs | G06N 7/005 |
| 2021/0255927 | A1* | 8/2021 | Kannan | G11C 29/76 |
| 2022/0326866 | A1* | 10/2022 | Mujoo | G06F 3/0641 |

OTHER PUBLICATIONS

Interlandi, Matteo et al., Adding data provenance support to Apache Spark, The VLDB Journal, Revised: May 13, 2017 / Accepted: Jul. 24, 2017, Germany, Published Online Aug. 7, 2017.

Johnston, Wesley M. et al., Advances in Dataflow Programming Languages, AMC Computing Surveys, Mar. 2004, vol. 36, No. 1, pp. 1-34.

Palyvos-Giannas, Dimitris et al., Ananke: A Streaming Framework for Live Forward Provenance, PVLDB, vol. 14, No. 3.

Dave, Ankur et al., Arthur:Rich Post-Facto Debugging for Production Analytics Applications, University of California Berkley, 2013.

Chandy, K. Mani et al., Distributed Snapshots: Determining Global States of Distributed Systems, ACM Transactions on Computer Systems, Feb. 1985, vol. 3, No. 1.

Glavic, Boris et al., Efficient Stream Provenance via Operator Instrumentation, AMC Transactions on Internet Technology, Jan. 2014, vol. 5, No. N, Article A.

Palyvos-Giannas, Dimitris et al., GeneaLog: Fine-grained data streaming provenance in cyber-physical systems, Parallel Computing, Nov. 2019, vol. 89.

Olston, Chrstopher et al., Inspector Gadget: A Framework for Custom Monitoring and Debugging of Distributed Dataflows, VLDB, Aug. 2011, vol. 4, No. 12.

Carbone, Paris et al., Lightweight Asynchronous Snapshots for Distributed Dataflows, arXiv:1506.08603, Jun. 29, 2015.

Akidau, Tyler et al., MillWheel: Fault-Tolerant Stream Processing at Internet Scale, VLDB, Aug. 2013, vol. 6, No. 11.

Johnson, David B. et al., Sender Based Message Logging, Rice University Department of Computer Science, Houston, Texas, 1987.

Heise, Arvid et al., From Aligned to Unaligned Checkpoints—Part 1: Checkpoints, Alignment, and Backpressure, http://flink.apache.org/2020/10/15/from-aligned-to-unaligned-checkpoints-part-1.html, Oct. 15, 2020.

Apache Flink 1.12 Documentation: Stateful Stream Processing, http://ci.apache.org/project/flink/flink-docs-release-1.12/concepts/stateful-stream-processing.html#unaligned-checkpointing.

Apache Flink 1.12 Documentation: Checkpoint, http://ci.apache.org/projects/flink/flink-docs-stable/ops/state/checkpoints.html.

Yocum, Kenneth et al., Scalable Lineage Capture for Debugging DISC Analytics, 4th Annual Symposium on Cloud Computing, Oct. 2013, Article No. 17, pp. 1-15.

Strom, Robert E. et al., Optimistic Recovery in Distributed Systems, ACM Transactions on Computer Systems, Aug. 1985, vol. 3, No. 3, pp. 204-226.

Garcia-Molna, Hector et al., Sagas, ACM SIGMOD International Conference on Management of Data, Dec. 1987, pp. 249-259.

Mei, Yuan et al., Rethinking of Fault Tolerance in Flink: What Lies Ahead?, https://youtu.be/ssEmeLcL5Uk, Aug. 28, 2020.

Nowojski, Piotr, Faster Checkpointing Through Unaligned Checkpoints, https://youtu.be/-ABPHMhrecQ, Oct. 15, 2019.

Akidau, Tyler et al., Streaming Systems; The What, Where, When, and How of Large-Scale Data Processing; Chapter 5, pp. 121-138; Published by O'Reilly Media, Inc., Sebastopol, California; First Edition; Aug. 2018.

Extended European Search Report for EP Application No. 21210092.9-1203, dated May 17, 2022, 8 pages.

* cited by examiner

ROLLBACK RECOVERY WITH DATA LINEAGE CAPTURE FOR DATA PIPELINES

TECHNICAL FIELD

Embodiments generally relate to accurate and repeatable rollback recovery in data pipelines. More specifically, embodiments relate to rollback recovery with efficient fine-grained data lineage capture in connection with distributed data pipeline execution.

Data pipelines enable processing of large volumes of bounded and unbounded data. Typically, data pipelines ingest data from data sources, transform the data, and enable subsequent data storage or further processing of the data. Ideally, a distributed data pipeline can be viewed as a single application entity from the user perspective. It therefore becomes a responsibility of execution infrastructure around the data pipeline to hide technical details related to distributed execution of the data pipeline, including potential failure of a component within the data pipeline. One requirement is the ability to recover from system failures relating to communication between processes, typically where messages are lost, or during the execution of a process, where some execution state of the process is lost. When a failure occurs, a rollback recovery protocol must be applied to restore a correct state of the data pipeline corresponding to an earlier point in time of execution of the data pipeline so that execution of the data pipeline may resume. A correct state is restored if the result of a subsequently resumed execution of the data pipeline would be identical to a failure-free execution.

To establish accurate rollback recovery of a data pipeline, it is necessary to ascertain the state of a data pipeline at certain times during execution. Two main decisions impact the design of rollback recovery algorithms: (i) the construction of the state of the data pipeline, which involves several questions such as: what state to capture, when and where to capture it, and (ii) how to restore a correct state when recovering from a failure. The effectiveness of an algorithm depends on parameters such as the space overhead required to capture the state, the latency incurred by storing the state, the possible creation of a bottleneck for an entire pipeline execution, and the amount of redundant processing that must be done after recovery, which affects the total response time of the data pipeline when a given failure occurs. A fundamental requirement that must be fulfilled by the recovery protocol is that no intervention is required by the developer of a data pipeline or the application to recover a failed data pipeline: the system automatically maintains a state of the pipeline execution, according to some predefined policy to which each operator must adhere so that the data pipeline may recover automatically from failures.

A further issue associated with distributed data pipelines is the computational complexity and potentially large storage required to capture a fine-grain data lineage of a data pipeline execution. Data lineage describes the relationship between individual input and output data items of a computation. A data item can be as granular as a record in a table. For instance, given an erroneous output record in a data pipeline, it is helpful to retrieve the intermediate or input records that were used to generate the erroneous record. This helps investigating the root cause for the error (e.g., bad input data to the data pipeline, or erroneous computation in an operation). Similarly, identifying output records that were affected by corrupted input records can help prevent erroneous computations. Accordingly, what is needed is an accurate and repeatable rollback recovery mechanism that can also provide efficient fine-grained data lineage capture in connection with distributed data pipeline execution thereby addressing the above-mentioned problems.

SUMMARY

Disclosed embodiments address the above-mentioned problems by providing one or more non-transitory computer-readable media storing computer-executable instructions that, when executed by a processor, perform a method for performing rollback recovery with data lineage capture for data pipelines, the method comprising: at a middle operator, receiving, from a source operator, one or more input events ingested by the source operator by way of a read operation to an external input data source, logging information regarding one or more middle input events to a middle operator input log associated with the middle operator, wherein the one or more middle input events are logged with an incomplete logging status designation, processing data associated with the one or more middle input events, updating one or more middle input log entries setting the one or more middle input log entries to a completed logging status designation corresponding to a consumed subset of the one or more middle input events that were consumed to produce the one or more middle output events, transmitting the one or more middle output events to one or more subsequent operators, and based on receiving a recovering message from one or more subsequent operators, resending corresponding middle output events that remain in the middle output log.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein.

Figure 1:
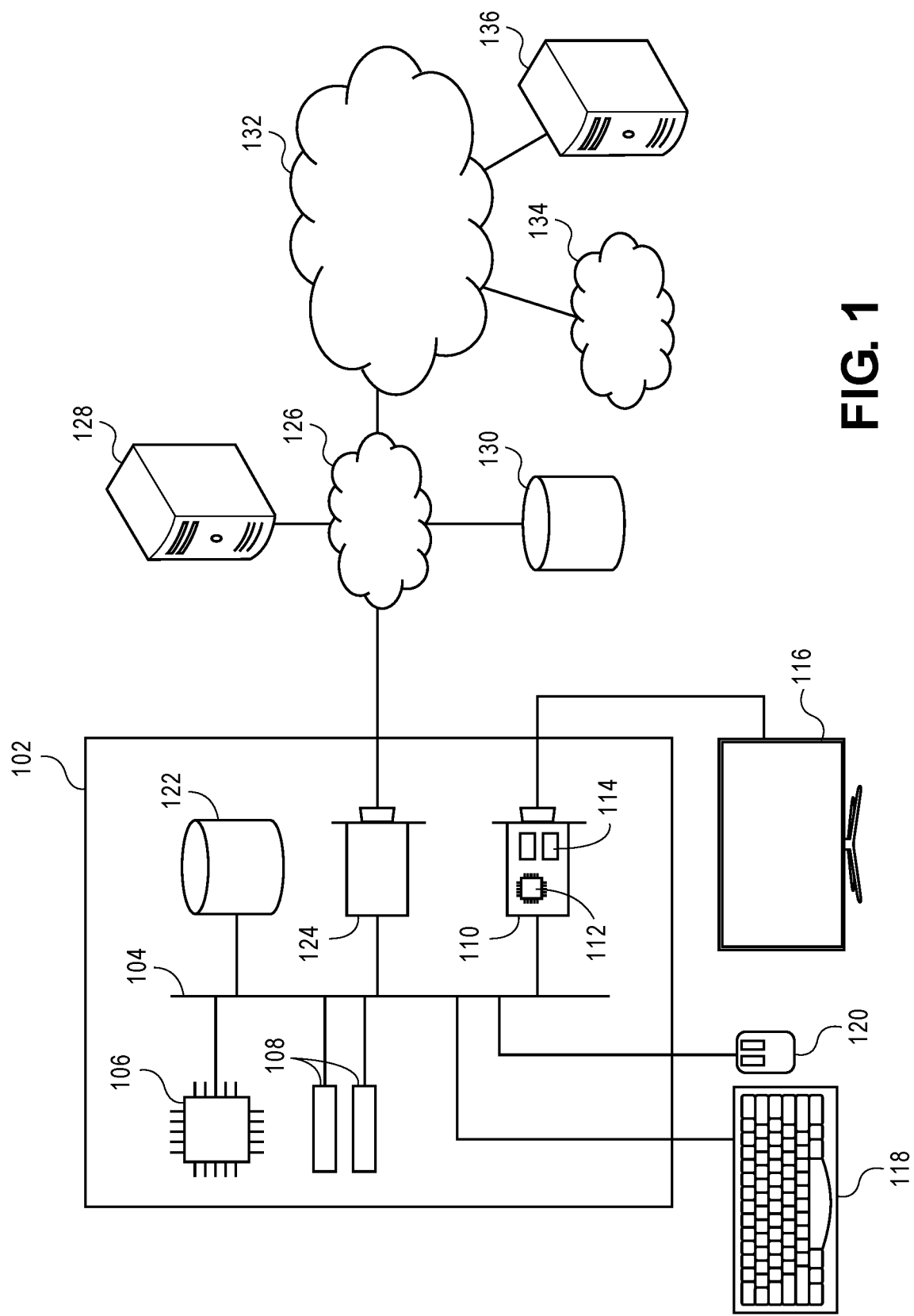
FIG. 1 depicts an exemplary hardware platform for certain embodiments.

The drawing figures do not limit the invention to the specific embodiments disclosed and described herein. The drawings are not necessarily to scale, emphasis instead being placed upon clearly illustrating the principles of the disclosure.

DETAILED DESCRIPTION

In some embodiments, a data platform is disclosed that enables provision and execution of applications in the form of data pipelines in a massively scalable distributed architecture. In some embodiments, the distributed architecture is provided in connection with a serverless cloud services environment. The programming concepts related to the associated data pipelines disclosed in connection with the current embodiments are based on a flow-based programming paradigm. As described herein a "data pipeline" may be represented as a directed graph of black-box components, henceforth called "operators" that exchange information packets (also called "messages" or "events" interchangeably) through connections relating an operator's "output port" to an operator's "input port". An operator represents an asynchronous process that is executed in a data-driven mode, i.e., whenever its necessary inputs are available in its input ports. Operators can be grouped to execute together in one execution environment (for instance, within the same application container). A group of operators can be configured to run with a dedicated multiplicity, that is, the group can be replicated into multiple instances, each of which running in its own node or execution environment.

Described herein are several types of operators: (i) source operators that ingest the data into the data pipeline and have no predecessor operator (they have no input connection), (ii) reader operators that read data from an external system and output data on its output ports—they can have input ports, (iii) middle operators that take intermediate results and produce intermediate results, and (iv) writer operators that write data into an external system. A source operator can be a reader operator, but some reader operators are not source operators because they have one or more connected input ports. A middle operator can be a writer operator, but some writer operators are not middle operators because they have no output connections.

In various embodiments as used herein, messages exchanged on a connection have a header containing metadata information and the datasets transported via messages have a logical tabular format. Thus, in various embodiments, each dataset has a table schema and consists of a set of records. For the purposes of the present teachings there is no imposition of any specific granularity of messages, which messages may either consist of a single record or a collection of records. In various embodiments, datasets can be bounded (i.e., have a fixed size), or unbounded (i.e., be infinite), the latter being referred to herein as a "stream."

Each type of above-enumerated operator performs a differently with respect to creating logs for rollback recovery and data lineage capture. Source operators ingest data into the data pipeline either by self-generating data or by reading data from an external system like a database, a file system, or queues of a publish-subscribe system, as specified by its configuration parameters. Source operators output events that carry table records. They also maintain a log of the events they ingest into the data pipeline, called an output log.

All other operators have a common behavior with respect to logging. For example, if operator A sends an event e to an operator B. Then the following steps are carried out. First, A records in an output log that event e was sent to B, with a status "undone," corresponding to an incomplete logging status designation. Then B records event e in its input log with status "undone." When B produces an output event, B uses a single atomic transaction to: (i) log the output event with a system-generated ID (e.g., a sequence number) in its output log, mark its status as "undone", and keep a reference to the set of input events that were used to produce it; and (ii) mark the status of the corresponding input events as "done" in its input log. A "done" status corresponds to a logging complete logging status designation. In the background, asynchronous "garbage collection" tasks are executed. In one background task, operator B tells operator A the input events that have status "done", and A will set these events to "done" in its output log. Then in another background task, operator A instructs operator B to forget, expire or otherwise discard the events that are "done" in its output log, and similarly B removes them from its input log.

In various embodiments, a corresponding rollback recovery process works as follows. After a failure has occurred, each failed process recovers from its durable (input and output) logs. The following steps happen for each recovering process A. First, all receivers of an output event from A receive a "recovering" message from A. If a receiver process B receives a "recovering" message, it sends back an "ack" message to A containing the latest event ID received from A. Then A sends all its output events since that ID with status "undone" to B. Next, all senders of an event in the input log of A with status "undone" receive a "recovering" message from A containing the latest event ID received from the sender. If a sender process B receives a "recovering" message from A, it sends again all its output events since that ID with status "undone" to A. Next, when A receives an event, A checks whether A already has it in A's input log before logging the event. All recovered input events with status "undone" are received before processing the corresponding events in order.

The handshake described above has two purposes. First, it synchronizes A and B on the latest events received or sent. Second, it supports the failure of multiple nodes, that is, when A and A's related processes have failed, subsequent processing may be carried independently, and non-failed processes can continue to execute.

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments

Turning first to FIG. 1, an exemplary hardware platform for certain embodiments is depicted. Computer 102 can be a desktop computer, a laptop computer, a server computer, a mobile device such as a smartphone or tablet, or any other form factor of general- or special-purpose computing device containing at least one processor. Depicted with computer 102 are several components, for illustrative purposes. In some embodiments, certain components may be arranged differently or absent. Additional components may also be present. Included in computer 102 is system bus 104, via which other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also, on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, such as non-transitory computer readable media, and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the Institute of Electrical and Electronics Engineers (IEEE) 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over public Internet 132. Local network 126 is in turn connected to public Internet 132, which connects many networks such as local network 126, remote network 134 or directly attached computers such as computer 136. In some embodiments, computer 102 can itself be directly connected to public Internet 132.

Figure 2:
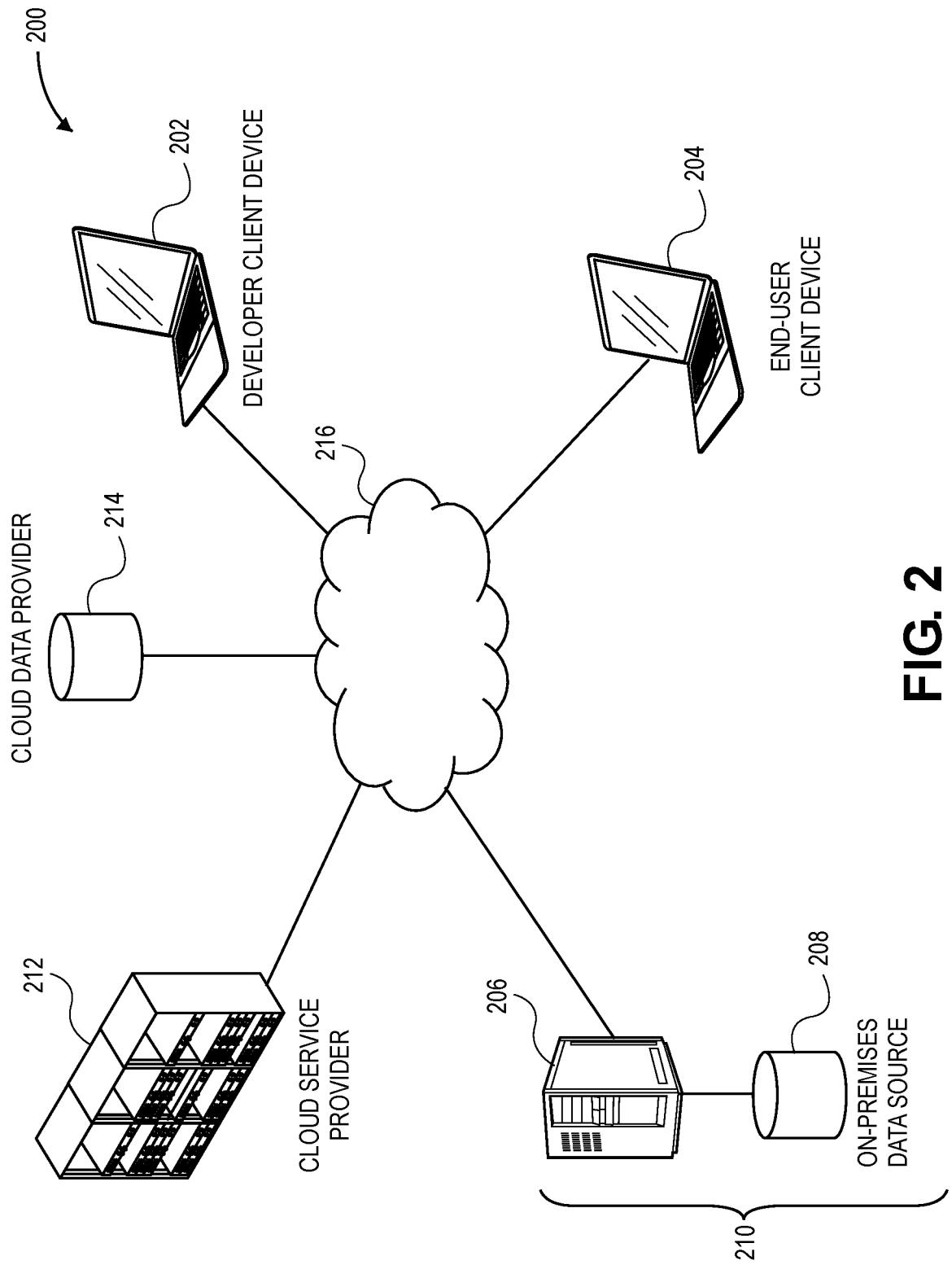
FIG. 2 depicts components of a system for carrying out certain embodiments.

Turning now to FIG. 2, an exemplary diagram illustrating components of a system for carrying out embodiments is depicted and referred to generally by reference numeral 200. System 200 provides a platform for building, deploying, running, monitoring, and maintaining data pipelines. System 200 includes any number of client devices such as end-user client device 204 and developer client device 202. An individual user may connect to components of system 200 using a single client device or multiple client devices, either concurrently or sequentially. Similarly, in some embodiments, multiple users may share (concurrently or sequentially) a single client device to access the analytics associated with the data pipeline. As depicted in FIG. 2, client devices may be any form of computing device discussed above with respect to FIG. 1. In particular, a user may access components of system 200 using a desktop, a laptop, or a mobile device. Components of system 200 may be accessible via dedicated software of a particular client device or via a web browser associated with the client device. In some embodiments, developers and application hosting system administrators can access administrative functionality via any client device. In other embodiments, administrative functions can only be accessed from a limited subset of client devices (for example, only via developer client device 202). In some embodiments, on-premises data source 210 is an enterprise application including application server 206 and application data source 208. On-premises data source 210 may also be a data hub, a data mart, a data lake, a relational database server, or a database server that does not incorporate relational database principles. On-premises data source 210 may provide data in a structured or unstructured manner. Data associated with on-premises data source 210 may be finite in size or provided as an unbounded stream.

In some embodiments, on-premises data source 210 provides services in connection with application server 206. On-premises data source 210 may be a dedicated server, a shared server, a virtual machine instance in a cloud computing environment, or any other form of computing device discussed above with respect to FIG. 1. Although a single application server 206 is depicted, embodiments with multiple such application servers are also contemplated so as to provide scale, redundancy and/or isolation between different instances of applications and data sources.

Cloud service provider 212 represents an on-demand cloud computing platform providing data storage and computing resources in the form of dedicated servers, shared servers, virtual machine instances in a cloud computing environment, or any other form of computing device discussed above with respect to FIG. 1. Cloud service provider 212 may provide software as a service (SaaS), infrastructure as a service (IaaS) or platform as a service services (PaaS), including serverless execution in an event-driven serverless execution environment. A serverless execution environment may enable the deployment of an application container that is built for a particular execution environment. Broadly, an application container is an isolated instance of a particular application including application code, application configuration resources, and certain associated libraries and application dependencies allowing rapid and independent deployment of that application.

Exemplary application server 206 is communicatively coupled to client devices 202 and 204 as well as cloud service provider 214 via network 216. Network 216 may be a local area network (LAN), wide-area network (WAN), virtual private network (VPN) or the Internet. Broadly speaking, any type of network for providing communication between the various components of system 200 is contemplated. Application server 210 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client application are also contemplated.

Application data source 208 is communicatively connected to application server 210. As depicted, application data source 208 is directly connected to application server 210; however, any form of communicative connection (for example, network-attached storage (NAS), a network file system (NFS), or cloud-based storage) can be employed. Broadly speaking, application data source 208 stores substantially all of the durable information used by application server 210. As previously discussed, multiple application servers may be present in system 200. In such embodiments, application server may have its own copy of application data source 208. Alternatively, multiple group-based communication system servers may share a single network-attached application data source. Alternatively, or in addition, in any of these embodiments, data may be sharded across multiple application data sources.

Operation of Embodiments

Figure 3A:
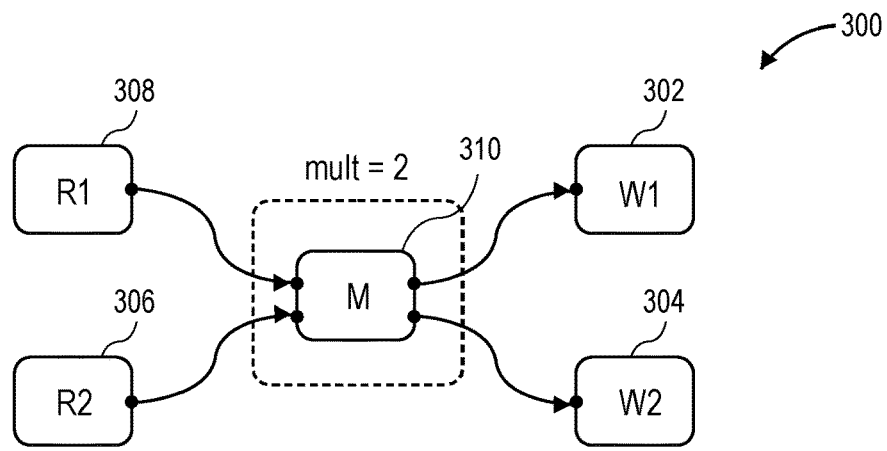
FIG. 3A depicts an exemplary data pipeline in accordance with various embodiments.

Turning now to FIG. 3A, exemplary data pipeline 300 is depicted in accordance with various embodiments. Data pipeline 300 is composed of five operators: operator 302 labeled "W1," operator, 304, labeled "W2," operator 306 labeled "R2," operator 308 labeled "R1," and operator 310 labeled "M." Each of the depicted operators has ports represented by black dots, with connections represented by directed links. As depicted, operators R1 and R2 are both reader and source operators, they have no input connections. Operator M is a middle operator and operators W1 and W2 are two writer operators which have no output connections. Finally, operator M is encapsulated within a group with a multiplicity of 2, meaning operator M is instantiated on two nodes potentially operating in parallel.

When a data pipeline is deployed on a distributed system architecture, each operator is translated into a process that either runs individually, or within a generic process called a sub-engine, as described below in connection with various example implementations of an exemplary pipeline engine platform. In some embodiments, each group of operators is executed on a different processing node of the distributed system. A node can be as general as a physical machine, a virtual machine, a processor of a machine, or an encapsulation of a set of containerized applications (e.g., a Kubernetes pod). In some embodiments, if a group has a multiplicity greater than 1, a replica of each group is executed on a different processing node. Within a processing node, operators communicate using local inter-process or inter-thread communication, and typically communications between nodes occurs through remote process communications. In various embodiments, communications between processes are performed using an asynchronous message passing framework, which can be realized, for instance, via a publish-subscribe message distribution model, a logically global associative memory, or using low-level communication primitives within a container UNIX pipes or sockets. Each processing node provides a shared durable storage accessible to processes running on the particular node. Thus, there is not necessarily a unique global shared storage service between all the processing nodes, although such a unique global shared storage service has certain advantages as set forth below.

Figure 3B:
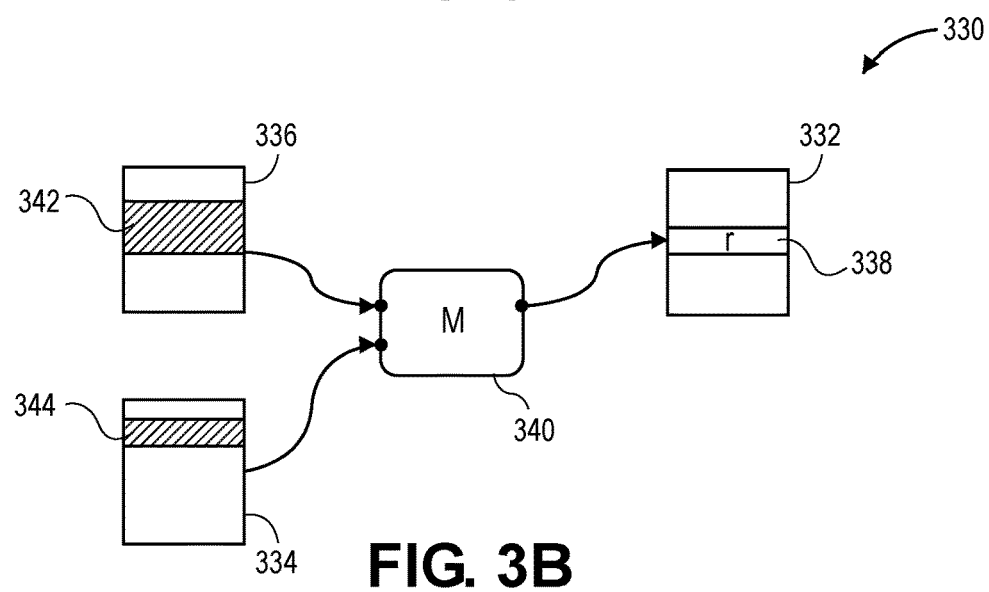
FIG. 3B depicts an exemplary block diagram illustrating data lineage capture in accordance with various embodiments.

Turning now to FIG. 3B, an exemplary block diagram 330 is depicted, illustrating data lineage capture in accordance with various embodiments. Block diagram 330 illustrates the data lineage capture for an operator M as described above in connection with data pipeline 300. Input sets 336 and 334 represent respectively all the input events consumed by operator M, denoted by 340, on its input ports, and output set 332 represents all the output events produced by M. Given a record 338 labeled "r" in output set 332, a backward data lineage query would return for each input of M the set of records represented by the sets of records 342 and 344 that were responsible for the generation of record 338. Data lineage queries are further explained below.

Figure 3C:
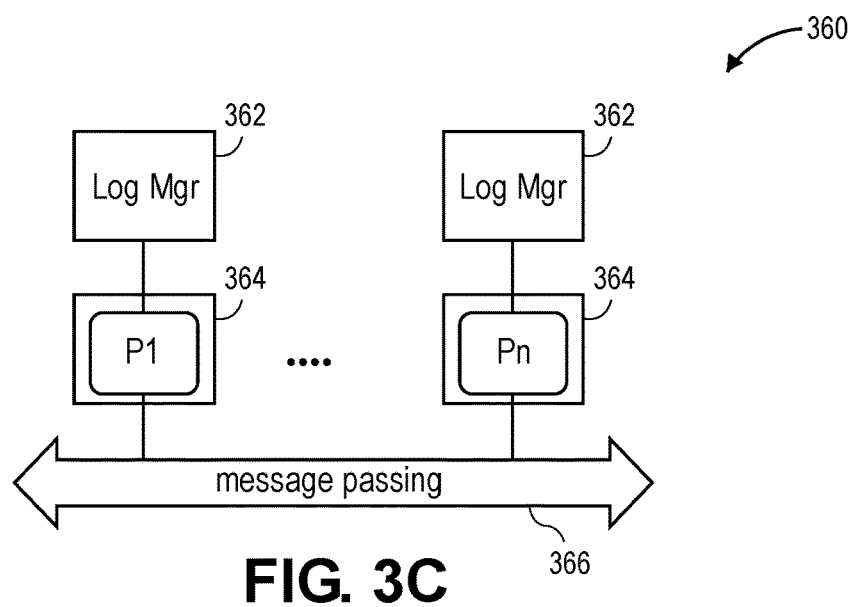
FIG. 3C depicts an exemplary block diagram illustrating components involved in the processing of a data pipeline in accordance with various embodiments.

Turning now to FIG. 3C, an exemplary block diagram 360 is depicted, illustrating components involved in the processing of a data pipeline in accordance with various embodiments. In various embodiments, the components depicted in block diagram 360 provide a platform for implementing a pipeline execution engine. Log manager 362 is responsible for the support of data properties of atomicity, consistency, isolation, durability (ACID) transactions on the input and output logs of the operators. In some embodiments, the existence of a single shared log manager 362 is not required for managing logs associated all operators, which is to say that all logs may be distributed and managed by a plurality of log managers 362. The remaining components are the various processes 364 deployed on the processing nodes, as described above. In some embodiments, in connection with a data pipeline engine, each processing node includes a component that manages the lifecycle of the processes implementing the operators in the node. Such a component (not shown) may be called a "group manager" or a "job manager." Messages are passed on message bus 366.

Figure 4A:
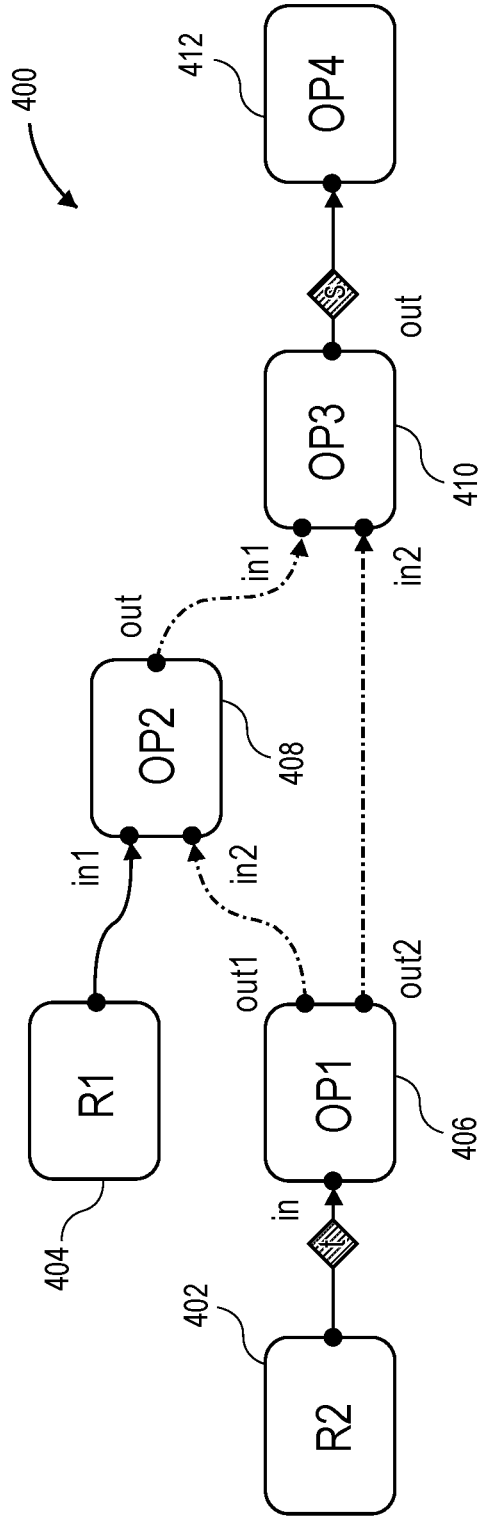
FIG. 4A depicts an exemplary data pipeline illustrating data lineage paths and points of analysis in accordance with various embodiments.

Turning now to FIG. 4A, an exemplary data pipeline 400 is depicted, illustrating data lineage paths and points of analysis in accordance with various embodiments. The present teachings disclose fine-grain data lineage processing in connection with data lineage capture that occurs in connection with logs needed to implement the presently disclosed rollback recovery mechanisms. A fine-grain data lineage state of each operator is captured by the log-based recovery protocol. A data storage size tradeoff exists, however, in tension between the garbage collection of the logs and the need to keep the contents of the logs for data lineage queries. In various embodiments, this tradeoff is managed by extending various rollback-recovery embodiments to support two principal data lineage use cases described below.

A principal benefit of fine-grain data lineage queries disclosed in connection with the present teachings is the following. First, it may be useful to identify a root cause for an arbitrary error or inconsistent computation based on events upstream on a pipeline for some observed events in the output port of a downstream operator. Secondly, it may be useful to identify an impact of data events at an input port of an operator on the output of some operators downstream on a pipeline. Accordingly, it is useful to define an "analysis-start-point" in a data pipeline as a point from which a data lineage analysis is started. A point of analysis corresponds to the input or output port of an operator for which to inspect corresponding input or output events stored in a particular log. Next, an "analysis-target-point" is taken as a point in the data pipeline from which can be observed a result of a forward or backward data lineage analysis, that is, the result of a data lineage query. In various embodiments, the analysis start and target points define a set of paths of connections in the data pipeline that is used to formulate and process forward or backward data lineage queries, depending if the target point is downstream or upstream, respectively. As depicted in data pipeline 400, input and output ports are labelled with corresponding names. The points of analysis are represented by grey diamonds, with the starting point labelled as "s" and the target point labelled as "t". These two points define two backward data lineage paths (represented by dashed lines): one from input in2 of OP3 (operator 410) to output out2 of OP1 (operator 406), and another from input in1 of OP3 to output out1 of OP1. Reader 402 designated R2 provides an input to operator 406. Reader 401 designated R1 provides an input to operator 408 designated OP2 in FIG. 4A. Operator 408 designated OP2 has an output that provides an additional input to operator 410 designated OP3. Finally, the starting point "s" of the backwards data lineage analysis is the input to OP4 (operator 412). In order to work backwards from starting point "s" to target point "t", data lineage query systems consistent with the present teachings traverse rollback recovery logs to determine particular input and output values that resulted in corresponding previous upstream calculations.

In some embodiments, supporting fine-grain data lineage in a data pipeline that processes streams, i.e., unbounded data, represents a significant challenge with respect to data lineage capture. Indeed, since it is not possible to know in advance when a data lineage query will be issued, an arbitrary cutoff must be established regarding how long to keep the contents of rollback recovery logs. To address this problem, a data lineage mode is established corresponding to data streaming use cases when it is necessary to detect that the events produced by a data pipeline represent critical or unusual situations and raise an alert for these events (henceforth called alert events). In these cases, it is useful to preserve upstream events that were responsible for generation of alert events, possibly up to the source operators that ultimately ingested some responsible events. This capability of finding "root causes" for alert events is referred to herein as fine-grain data streaming provenance.

In various embodiments, monitoring agents are introduced into a data pipeline at specific connections between operators to check conditions regarding events flowing through the specific connections. In some embodiments, monitoring agents have a single input port corresponding to a monitored connection. It is understood, however, that associated mechanisms disclosed herein may be generalized to support cases having a different number of input ports. Having multiple input ports enables a monitoring agent to use additional data (e.g., access data from an external system) to check a condition on the incoming events on a connection. Monitoring agents may also have two output ports: one, labelled a "good" output, that outputs events satisfying associated conditions and another port, labelled a "bad" output, that outputs events not satisfying associated conditions (i.e., the alert events). In some embodiments, logic associated with a monitoring event process functions to check a condition (stateless or stateful) on one or more input events and output these input events on one of its two output ports. An example of a stateless condition is to check that an attribute value of an event is not out of bounds or does not have an empty value. An example of a stateful condition is to detect outliers in a set of consecutive input events of a fixed size.

Figure 4B:
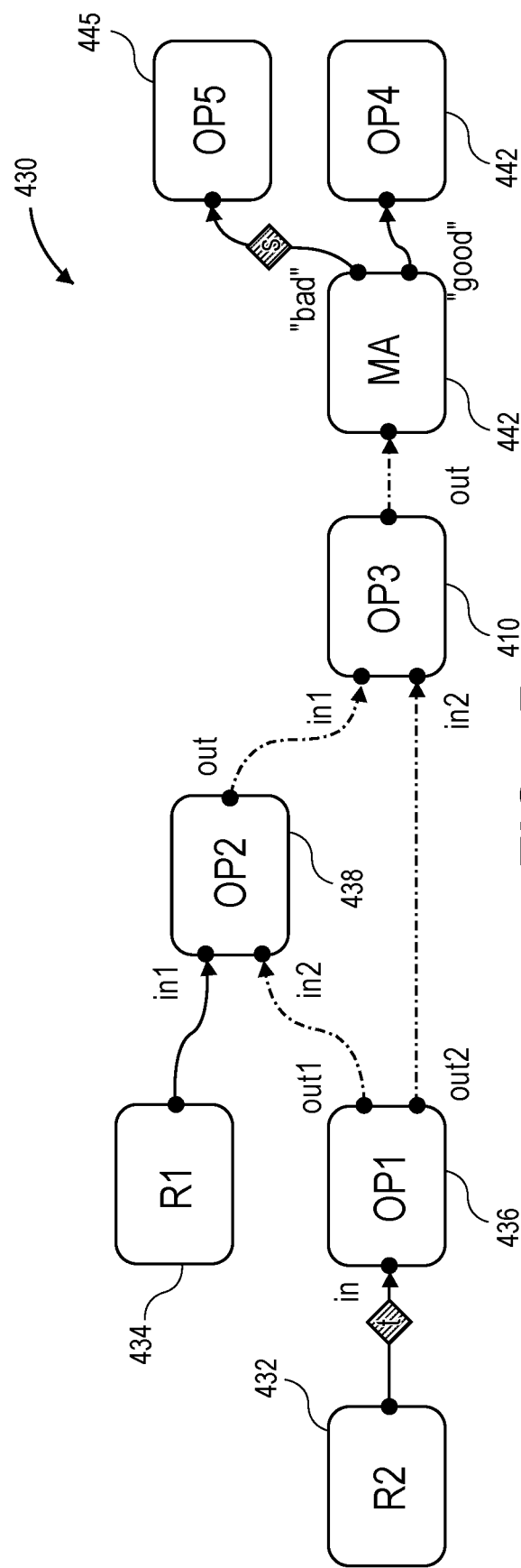
FIG. 4B depicts an exemplary data pipeline illustrating injection of a monitoring agent into a data pipeline in accordance with various embodiments.

Turning now to FIG. 4B, an exemplary data pipeline 430 is depicted, illustrating injection of a monitoring agent into a data pipeline in accordance with various embodiments. Data pipeline 430 represents the previous example of data pipeline 400 in which a monitoring agent 442 designated MA has been injected into the connection between operator 410 designated OP3 and operation 444 designated OP4 to detect alert events. A new operator 445 designated OP5 is introduced to manage alert events returned by monitoring agent 442. The output port "bad" of monitoring agent 442 is associated with starting analysis point "s." Setting a target analysis point "t" (e.g., on the input port of OP1) defines backward lineage paths that may be used to generate a backward lineage query.

In various embodiments, output ports of the monitoring agents are associated with possible starting points of analysis thereby preserving all events in rollback recovery logs that are necessary to provide underlying data associated with alert events generated at these points of analysis. This has at least two benefits. First, the scope of data lineage queries is restricted to the data lineage paths going from the bad output port of a monitoring agent to the target points of analysis. Thus, only the logs of operators located on these paths are implicated in data lineage capture. Second, the events that must be kept in these logs are scoped by the occurrence of alert events. Thus, if no alert event is detected by a monitoring agent, upstream events can be removed from the logs. Various embodiments described below describe alternative embodiments of the disclosed rollback-recovery protocol to implement associated changes to log entry preservation rules.

Figure 4C:
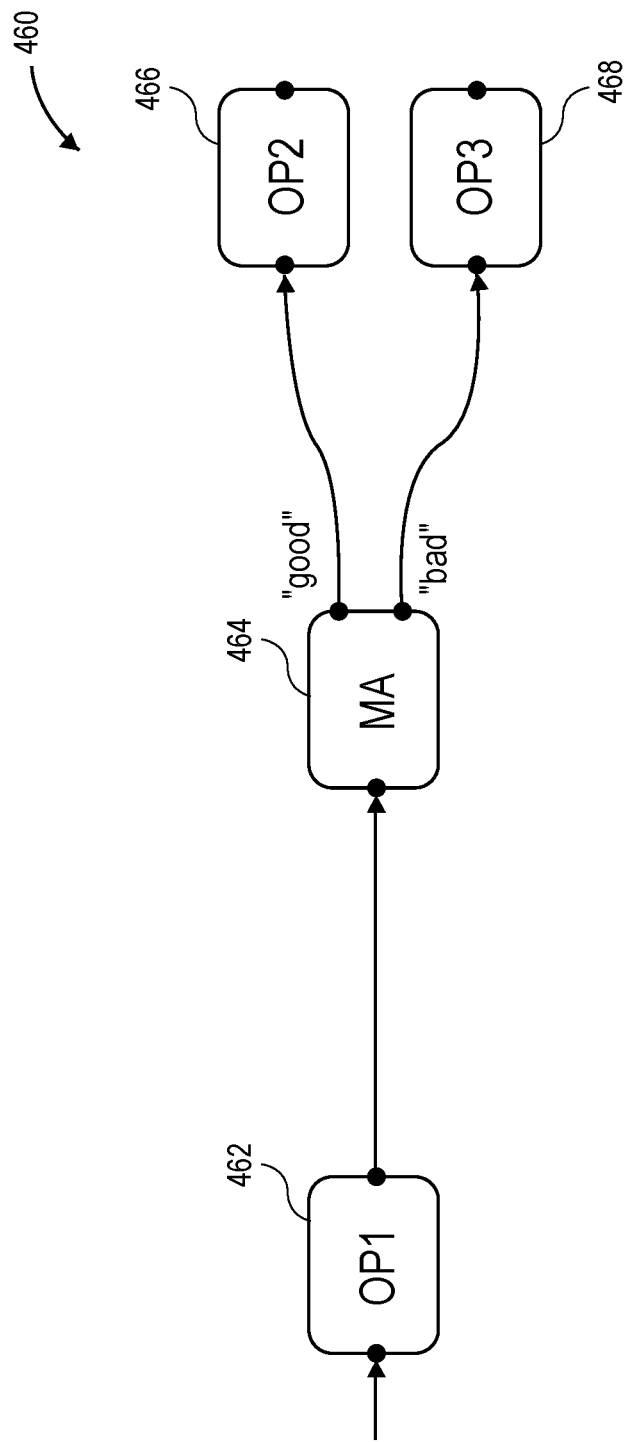
FIG. 4C depicts a partial data pipeline illustrating execution of a data pipeline with a monitoring agent in accordance with various embodiments.

Suppose that an event e is created on the bad output port of a monitoring agent. Normally, this event is logged in the output log and the status of the input events that were used to produce it are marked as "done." In some such embodiments, all input events that were used to produce an alert event, are marked with a status "freeze" instead of "done." The meaning of a "freeze" status is to keep the event in the log and avoid that the event is later garbage collected by associated background tasks Turning now to FIG. 4C, a partial data pipeline 460 is depicted, illustrating execution of a partial data pipeline with a monitoring agent in accordance with various embodiments. In partial data pipeline 460, a middle operator 462 designated OP1 (operators before OP1 not shown) has one output port connected to a monitoring agent 464 designated MA, which outputs its events to two recipients 466 and 468 designated OP2 and OP3, respectively. As depicted in FIG. 4C, a "bad" output is connected to OP3 and the condition check of the MA process is stateless (i.e., each output event refers to itself as an input event). Logs built during normal execution of an associated data pipeline is modified with the added step above. The input log of MA has two events e1 and e2. Operator MA produces event e2 on its "bad" output port and event e1 on its "good" output port. Thus, e2 is an alert event and its status is "freeze" in the output log of MA. Then since e2 depends on itself, event e2 must also be preserved in the input log of MA, hence its status is also set to "freeze" in the input log of MA, which will preserve the logged value in rollback recovery logs for the purpose of future data lineage queries. Finally, since e1 is not an alert event, and it depends on itself, the status of e1 is set to "done" in the input log of MA.

In various embodiments, logic associated with a log garbage collection task is adapted so that if an input event e has a status "freeze" in the input log of a process, then the task sends to the event's sender a "freeze" event (instead of an "ack" event), with the ID of the associated freeze event e. For all input events with status "done," the background garbage collection task operates as previously described.

Since the garbage collection process is performed independently for each process, it must be ensured that a process will not start discarding events that are actually needed to explain the root cause of a particular alert event that may occur downstream. Indeed, in the previous example, a garbage collection task may read an input log associated with a middle operator, such as OP1, send an "ack" to its sender process, and end up discarding all its "done" events thereby potentially discarding events necessary for future data lineage queries. This would have the undesirable effect of losing information by discarding the events that were used to generate e2, which ultimately may be needed to explain the alert event.

In one embodiment, a background task of every upstream process on a backward data lineage path of a monitoring agent reads the input log and does the following: First, if an event e has a status "done" and all the output events associated with e have a status "done" then the task sends to the event's origin an "ack" event with the ID of the done event e. Second, if an event e has a status "freeze" then the task sends to the event's origin an "freeze" event with an ID associated with event e.

In this embodiment, a background task of every process that is not on the backward data lineage path of a monitoring agent reads the input log and does the following: If an event e has a status "done" then the task sends to the event's origin an "ack" event with the ID of event e. When a process receives a "freeze" event for an event e, it sets its status to "freeze", in its output log and it sets the status of all input events associated with e to "freeze" in its input log. When a process receives an "ack" event for an event e, it does the following. If the event ID exists in the process's output log, the process sets the event's status to "done," otherwise the process sends a "forget" event with the same event ID to the process that sent the "ack" event. In this embodiment, another background task of every process reads its output log and does the following: if an event has a status "done" then the task sends to the event's recipient a "forget" event with the event ID, which can be performed in bulk and deletes the event from its output log. When a process receives a "forget" event for an event ID, it removes the event from its input log.

In some embodiments, a garbage collection task for middle operation OP1 blocks execution until the status of its output events is either set to "done" or "freeze," which means that OP1 received an "ack" or "freeze" event from the MA process. Where MA receives an "ack" event from process OP2 for event e1, once MA starts its garbage collection task, MA sends an "ack" event to process OP1 for event e1. MA then sends a "freeze" event to OP1 for event e2. When OP1 receives the "ack" and "freeze" events from process MA, it sets the status of e1 and e2 to "done" and "freeze" respectively in the output log of OP1, and OP1 sets the status of its input events b1 and b2, which generated e2, to "freeze." Next, the garbage collection tasks of OP1 begin execution and proceed based on a state consistent with the above-described event statuses. This state is safe because all events necessary to explain event e2 are marked with a status of "freeze" and will not be garbage collected.

Another mode of data lineage capture is disclosed, which is adapted to a development use case of a data pipeline. In this mode, a designer checks the correct behavior of a data pipeline under construction using test data. While performing tests, a data pipeline may be run for a limited amount of time and a designer can inspect the data output by some operators to check their correctness. Thus, it is known which output ports of operators at which data can be inspected for data lineage, but it is not known which data will be inspected. Accordingly, the previous technique that exploited the knowledge of alert events output by a monitoring agent to selectively freeze the contents of logs cannot be employed.

To overcome this, in some embodiments, the designer of a data pipeline initializes a starting point of analysis, and one or more associated target points of analysis, which are enabled when running the pipeline in a debugging mode. At runtime, all the logs on the backward data lineage paths starting from an analysis start point and going back to a target analysis point, will be kept. Similarly, all the logs on the forward data lineage paths starting from an analysis start point and going forward to a target analysis point, will be kept. When analysis points are statically set, a pre-computation phase can identify all the logs that must be kept intact and hence the processes for which garbage collection tasks must be disabled. In such a test or debug mode, a data pipeline is run for a limited amount of time, hence the size of the frozen logs is bounded.

Because data storage is typically considered to be finite, for data lineage capture, a definition is provided regarding how contents of the added data lineage capture logs eventually expire. In the above stream monitoring scenario, a triggering event for discarding events in the logs may be deletion of alert events. When an alert event is deleted then all associated "freeze" events that were solely used to explain the data lineage of these events can also be removed from the logs. These events can be computed incrementally, starting from the alert events. All "freeze" events that are used to produce an alert event e, and which have not been used to produce another alert event, can be discarded. To efficiently perform such a test, a counter may be maintained for each input event with status "freeze" that indicates the number of output events that refer to each input event. This may also be carried out in connection with merged log techniques as described below. The same process is then iteratively repeated along the backward data lineage paths of the monitoring agent. Eventually, the process terminates when the source processes are reached.

In various other embodiments, a configurable expiration time may be used for alert events, based on a timestamp that records the time at which the alert event was produced. The expiration time can be configured differently for each monitoring agent. When an alert event passes the expiration time, it is scheduled for deletion. Alert events and their data lineage can however be extracted from the logs and loaded into some third-party storage for later analysis if needed.

In the development and debug scenario, the execution of data pipeline is terminated at some point. The period during which events are kept in the logs must be defined. Here again, an expiration policy based on timestamps defining starting and ending times of a data pipeline may be used. Contents of the logs for old data pipeline executions may be discarded. This may be accomplished using a graph identifier associated with all events in the logs. In various embodiments, contents of the logs for a particular data pipeline execution are extracted and persisted, for example, in a third-party persistent storage.

In some embodiments, methods for processing data lineage queries depend on a particular data lineage use case. In a stream processing mode, a data pipeline runs continuously, and alert events are generated. As explained above, each "bad" output port of a monitoring agent is associated with a starting analysis point. Before running a backward data lineage query, an analyst must select one or more alert events and set an analysis target point for a particular query. This determines a set of backward data lineage paths used to process the query. In some embodiments, such queries are run concurrently to the data pipeline that continues its normal execution.

In development and debug mode, a designer of a data pipeline can set an analysis starting point and one or more associated analysis target points. This is done before deploying and executing the data pipeline. Unlike the stream processing mode, data lineage queries are started when the data pipeline is stopped. Before running a backward data lineage query, the analyst must select one or more events in the output log associated with the analysis starting point and select one of the predefined target points. This will determine a set of backward data lineage paths used to process the query. Processes for generating backward and forward data lineage queries are similar. For backward data lineage queries, a user selects certain output events in the output log associated with the analysis starting point. The user selection results in a simple initial filter on the output log considered for data lineage processing.

Figure 5:
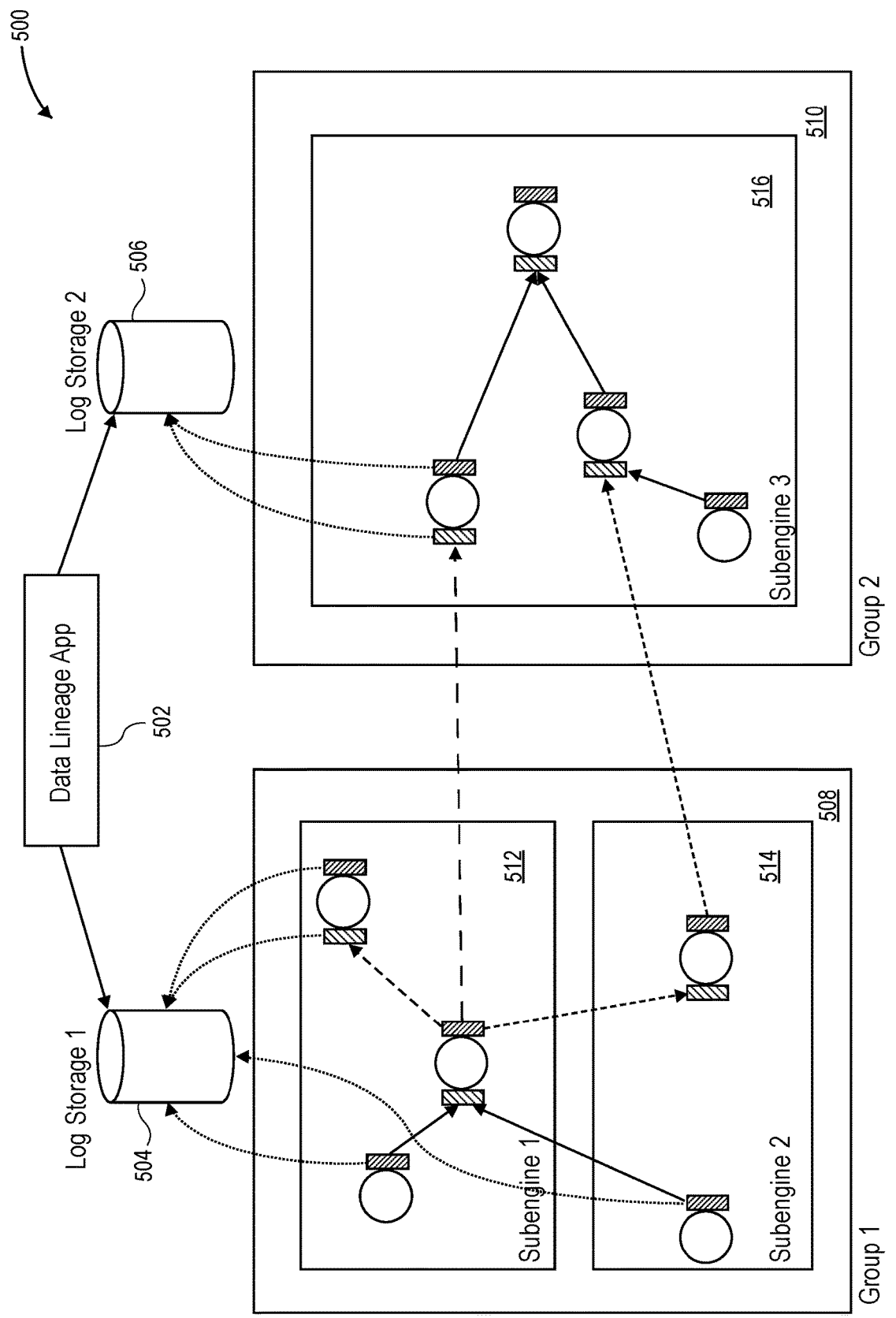
FIG. 5 depicts an exemplary block diagram illustrating the operation of a data lineage application in accordance with various embodiments.

Turning now to FIG. 5, an exemplary block diagram 500 is depicted, illustrating the operation of a data lineage application in accordance with various embodiments. Block diagram 500 illustrates the architecture for a specific pipeline with two groups 508 and 510 and three sub-engines 512, 514, and 516. The operators are represented by circles, and the rectangles on the left and right of the circles represent threads that handle and log input and output events, respectively. The dotted black arrows represent the connection between those threads and their assigned log back-ends (some of those connections are omitted for simplicity). The solid arrows represent data connections between operators and communication between garbage collector threads responsible for cleaning up each log.

In the depicted example, separate log storage back-ends 504 and 506 are provided for each group. The number of different back-end storages for the logs can either be configured by the user or be automatically determined by the system by trying to minimize some cost function (e.g., communication cost). The only constraint imposed by exemplary protocols is that the input and output logs of a given operator must be located in the same back-end storage, since the protocol requires an atomic operation of writing into the output log, and then changing the status of some events in the input log.

In various embodiments, data lineage source and target points of analysis may be specified at design time (before running the graph). In this way, the sub-graph description sent to each sub-engine, during pipeline startup, contains sufficient information to carry out data lineage capture without centralized coordination. In stream monitoring mode, data lineage application 502 may present all alert events returned by a monitoring agent and capture a user selection on these events. The user is also asked to define an analysis target point. The user selection and the analysis target point are then considered during the generation of data lineage queries. After the complete execution of the generated data lineage queries directly over the relevant log storage backends, data lineage app 502 returns a query result to the user. In some embodiments, data lineage application 502 may poll the source log looking for bad events. In development and debug mode, the data lineage application 502 operates similarly.

Figure 6:
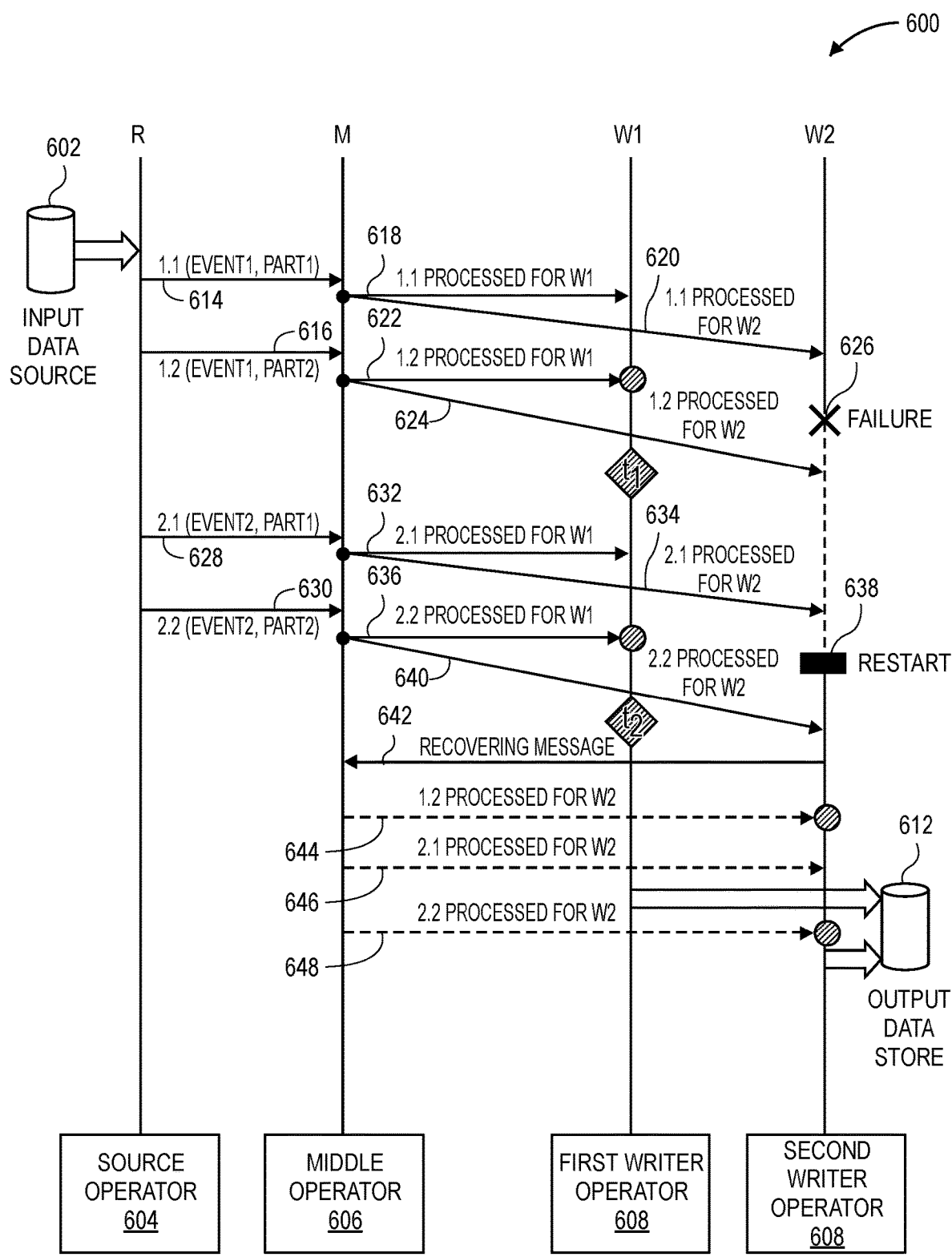
FIG. 6 depicts an exemplary data flow diagram illustrating the operation of an exemplary rollback recovery mechanism in accordance with various embodiments.

Turning now to FIG. 6, an exemplary data flow diagram 600 is depicted, illustrating the operation of an exemplary rollback recovery mechanism in accordance with various embodiments. In some embodiments data flow diagram 600 illustrates a rollback recovery mechanism that provides a unified solution for both rollback recovery and fine-grain data lineage capture in distributed data pipeline executions. The general idea is to maintain a durable state of the data pipeline that is enough to achieve a correct recovery after failure while enabling data lineage queries. The expected benefit is to get data lineage capture with very little associated overhead as a side-effect of the rollback recovery protocol.

Data flow diagram 600 is based on a pipeline diagram similar to pipeline diagram 300 of FIG. 3A with the exception that there is a single reader operator R and a single replica for M. Each operator is deployed on a separate processing node. The diagram of FIG. 6 illustrates a processing of the data pipeline. Source operator 604 performs two consecutive read actions (e.g., two database queries, one after the other), respectively resulting in the ingestion of the sequence of events each made up of two parts, i.e. event parts 614, 616, 628, and 630 in the pipeline. (i.e., event parts 614 and 616 are results of a first query of input data source 602, and event parts 628 and 630 are results of a second query input data source 602). Middle operator 606 (process M) is stateless and processes input events in order: when it receives an event e, process M generates two new multi-part events that are respectively sent to W1 and W2. When event 1 reaches process M, it is logged with a status "undone" in an input log associated with process M. Associated data is processed according to logic associated with process M, and then output events are generated within an atomic transaction and the status of the event is also set to "done", which is represented by a black dot.

Each writer process accumulates the received events originating from the same original read action and uses them to issue a single write transaction to an external system. A labelled grey diamond indicates the point at which a write transaction has been issued using the events previously received from M that are marked "done", which is represented by a grey dot. Thus, a transaction labelled "t1" in the grey diamond was formed at W1 using events 618 and 622 from the middle operator, and another transaction labelled "t2" was formed at W1 using events 632 and 636 from the middle operator.

A reliable communication protocol cannot however assure the reliability of event delivery when process failures occur. For example, if a sent event is lost because the intended receiver has failed, the communication protocol may generate a timeout and inform the sender that the event could not be delivered. However, the disclosed rollback recovery protocols eventually make all sent events available to the intended receiver(s) after successful recovery, to ensure a consistent state of the data pipeline execution.

In the working example, a node hosting process W2 fails while all other processes are still alive. Then all processes but W2 will keep running and process W2 will be restarted. When this happens, process W2 will execute the following steps: W2 sends a "recovering" message to M containing the ID of event 622, which is the last event successfully received by W2. Then M re-sends messages 644, 646, and 648, which are represented by dashed line arrows in FIG. 6.

After all recovery events are received by W2, the events 620 and 644 are used to form a first write transaction, and input events are updated with status "done" in the input log of W2." Next, the events 646 and 648 are used to form another write transaction. While the above steps are executed, the input log of M and the output log of R1 can be cleaned up by the background asynchronous garbage collection tasks.

In addition to maintaining necessary state to perform accurate pipeline rollback recovery, data lineage data is also captured. First, an overview is provided regarding a solution for data lineage capture that leverages the logs created by the disclosed mechanisms for rollback-recovery protocol. The general principle is to associate a reference with every output event of an operator A, which indicates the input events that were used by A to produce that event. Different types of references are possible. A reference can be the ID of an individual input event, or an offset interval of consecutive events in the input log, or a set of input events to which an ID was assigned when the events were received (such as a window ID, as defined in streaming systems).

A significant challenge associated with data lineage capture is to decide for how long the contents of the logs should be kept. In the case of stream data processing applications, where a data pipeline ingests a never-ending flow of events and can run indefinitely, it is, of course, not possible to keep the contents of the logs forever. A first solution targets applications that monitor processing of events in a pipeline and raise alerts when some events satisfy specific conditions. Associated data lineage methods minimize the number of events to keep in the logs so that backward data lineage queries can be answered efficiently for the events that raised alerts. More specifically, disclosed methods first relate to marking alert events with a status of "freeze" and then uses control messages exchanged by operators to ensure that the events that recursively contributed to produce the alert events are not garbage collected by a rollback-recovery protocol background process. Eventually, the logs only consist of events with a status of "freeze" and it is guaranteed that these are the minimal events that must be kept in the logs to support the processing of backward data lineage queries.

Another embodiment is disclosed for the case in which a data pipeline is run for a limited time, because either the input data ingested in the pipeline is bounded (e.g., input data is a file), or the pipeline execution is intentionally stopped at some point. This scenario is well suited for the development and debug phase of a data pipeline during which tests are run using limited test input data. This embodiment involves setting a starting point for analysis on the output port of an operator to indicate that all output events should be kept in the output log. The events in the log can be later inspected and a data lineage processing can be started using one or more of these events. To accomplish this, a target point of analysis can be set on the input port of another operator, and the paths of connection between these two starting and target points of analysis define the scope of a forward or backward data lineage query. All points of analysis are set before executing the data pipeline, which provides the ability to scope events in the logs that are required to be preserved for future data lineage queries in connection with one or more test or debugging sessions. The disclosed embodiments balance the choice between keeping the contents of the logs for resolving future data lineage queries and discarding events from the logs using background tasks that garbage collect the logs.

Data lineage queries may be performed in various ways. In some embodiments, for a given operator, a backward data lineage query is expressed as a single join between the output and input logs of the operator. An additional join is used to retrieve the data referenced by the event unique identifiers computed by the first join. The join expression between the input and output logs of an operator depends on the method used by output events to reference their contributing input events. Two different scenarios are described herein: (i) reference to a single data lineage path; and (ii) multiple data lineage paths.

For a single data lineage path, query generation may be illustrated in two steps. First, take as input a single data lineage path $\Phi$=(out.op1, in.op1, ... , out.opN, in.opN) and produce a query Q over the logs of operators "op1" to "opN". More specifically, a query is of the form: Q=(I, O, project, join), where I refers to the input log of operator "opN", O refers to the output log of "op1", project contains log fields that uniquely identify output events in O and input events in I, and join is a conjunction of join predicates that link the logs of "op1" up to "opN". Starting with a single data lineage path and assuming that the data lineage path is of length 1, i.e., the path goes from operator OP1's output port "out" to OP1's input port "in". So, $\Phi$=(out.op$_1$, in.op$_1$). Assuming a log structure consistent with logs described above with respect to various rollback recovery protocols, denote $I_1$ and $O_1$ the input and output logs of OP1 respectively. The query for an operator (here, for OP1) is defined as follows. The formulation of the join expression depends on the method used to reference input events within an output event.

TABLE 1

| Reference method | Query for an operator: $Q(I_1, O_1, project, join)$ |
|---|---|
| Reference to an input event | Project = <br> ($I_1$.Event_ID, $I_1$.Input_ID, $O_1$.Event_ID, $O_1$.Output_ID) <br> Join = ($I_1$.Event_ID = $O_1$.In_Event_ID and $I_1$.Input_ID = $O_1$.Input_ID) |

TABLE 1-continued

| | |
|---|---|
| Reference to an input group | Project = ($I_1$.Event_ID, $I_1$.Input_ID, $O_1$.Event_ID, $O_1$.Output_ID)<br>Join = ($I_1$.Group_ID = $O_1$.In_Group_ID and $I_1$.Input_ID = $O_1$.Input_ID) |
| Reference to an input interval of events | Project = ($I_1$.Event_ID, $I_1$.Input_ID, $O_1$.Event_ID, $O_1$.Output_ID)<br>Join = ($I_1$.Input_ID = $O_1$.Input_ID and $I_1$.Event_ID > $O_1$.In_Min_Event_ID and $I_1$.Event_ID < $O_1$.In_Max_Event_ID ) |

Given a data lineage path $\Phi=(out.op_1, in.op_1, \ldots, out.op_n, in.op_n)$. Let $Q_i(I_i, O_i, project, join)$ be the query associated with sub path $\Phi_i=(out.op_i, in.op_i)$ in $\Phi$, and $Q_i$.join the join clause of $Q_i$. A bridge query between two operators is defined as follows: Let $Q_i(I_i, O_i, project, join)$ and $Q_{i+1}(I_{i+1}, O_{i+1}, project, join)$ be two queries associated with each sub path $\Phi_i=(out.op_i, in.op_i)$ and $\Phi_i=(out.op_{i+1}, in.op_{i+1})$ in $\Phi$, the bridge query $Q_{i,i+1}(O_{i+1}, I_i, project, join)$ is as follows:

TABLE 2

Bridge query between two operators: $Q_{i,i+1}(O_{i+1}, I_i, project, join)$
Project = ($O_{i+1}$.Event_ID, $O_{i+1}$.Input_ID, $I_i$.Event_ID, $I_i$.Output_ID)
Join = ($I_i$.Event_ID = $O_{i+1}$.Event_ID and $I_i$.Sender_ID = $O_{i+1}$.Input_ID)

Then in the query $Q(I_n, O_1, project, join)$ for the entire path $\Phi$, the join expression is built by composing and interleaving the join expressions of the queries for a path of length 1 with the bridge queries, as follows:

TABLE 3

Query for a single path: $Q(I_n, O_1, project, join)$
$\Phi = (out.op_1, in.op_1, \ldots, out.op_n, in.op_n)$.
Project = ($I_n$.Event_ID, $I_n$.Input_ID, $O_1$.Event_ID, $O_1$.Output_ID)
Join = $Q_1$.join and $Q_{1,2}$.join and $Q_2$.join and ... and $Q_n$.join Referring back to FIG. 4A, consider an exemplary data lineage path: $\Phi_1=(out.op3, in1.op3, out.op2, in1.op2, out1.op1, in.op1)$. Each individual query fragment is calculated as follows. Each join expression below is abbreviated by indicating names of the logs that are joined with the symbol N denoting a join operation. Each query below is alternatively a query for an operator and a bridge query between two operators.

TABLE 4

| Query | Join expression |
|---|---|
| $Q_1$ | $O_1 \bowtie I_1$ |
| $Q_{2,1}$ | $I_1 \bowtie O_2$ |
| $Q_2$ | $O_2 \bowtie I_2$ |
| $Q_{3,2}$ | $I_2 \bowtie O_3$ |
| $Q_3$ | $O_3 \bowtie I_3$ |

In this example, the final join expression of the query for $\Phi_1$ is the conjunction of the individual join expression fragments, namely: $Q(\Phi_1)$.join=$Q_1$.join and $Q_{1,2}$.join and $Q_2$.join and $Q_{3,2}$.join and $Q_3$.join In various embodiments, an alternative query generation process is employed for multiple data lineage paths. Take, for example, two data lineage paths $\Phi_1=(out.op_i, \ldots, in.op_n)$ and $\Phi_2=(out.op_1, \ldots, in.op_n)$ such that there exists a common operator op in both paths. Thus, we have sub paths $(out.op_i, in.op_i)$ in $\Phi_1$ and $(out'.op_j, in'.op_j)$ in $\Phi_2$ such that $op_i=op_j=op$.

In this case, two queries are first computed, one for each sub path, $(out.op_1, \ldots, in.op_i)$ and $(out.op1, \ldots, in'.op_j)$, using the same method as before for a single path. Note that the result of each query has exactly the same schema (same fields), as defined by the project clause of the query. Thus, assuming a notation of I corresponding to the input log of operator op, the schema of each query is: (I.Event_ID, I.Input_ID, $O_1$.Event_ID, $O_1$.Output_ID). Next is performed a duplicate-free set union of the two result sets of the queries projected on the fields of input log I. The result, denoted I', is used to compute the subset of the output logs that should be used as the starting output logs to build the queries associated with each remaining sub path $(out.op_{i+1}, \ldots, in.op_n)$ and $(out.op_{j+1}, \ldots, in.op_n)$. Thus, I' is used to define the join expressions in the bridge queries $Q_{i,i+1}$ and $Q_{j,j+1}$, for each path in $\Phi_1$ and $\Phi_2$ respectively, as follows:

TABLE 5

Bridge query: $Q_{i,i+1}(O_{i+1}, I', project, join)$
Join = (I'.Event_ID = $O_{i+1}$.Event_ID and I'.Sender_ID = $O_{i+1}$.Input_ID)

TABLE 6

Bridge query: $Q_{j,j+1}(O_{j+1}, I', project, join)$
Join = (I'.Event_ID = $O_{j+1}$.Event_ID and I'.Sender_ID = $O_{j+1}$.Input_ID)

The bridge queries define the respective starting output logs that must be considered to build the queries associated with each sub path $(out.op_{i+1}, \ldots, in.op_n)$ and $(out.op_{j+1}, \ldots, in.op_n)$.

The same method may be applied for any number of data lineage paths that have an operator in common. We then take the remaining sub paths that must be evaluated and proceed using the same method until no more sub path remains. An example may be illustrated by referring back to FIG. 4A, considering two paths denoted $\Phi_1$ and $\Phi_2$. The only common operator on these two paths is OP3. Thus, what is needed is to compute corresponding queries for the paths up to OP3. Analogously to the calculation above for $\Phi_1$, a similar method may be applied to compute the query for $\Phi_2=(out.op3, in1.op3, out2.op1, in.op1)$. As above, take the following query fragments:

TABLE 7

| Query | Join expression |
|---|---|
| $Q_1$ | $O_1 \bowtie I_1$ |
| $Q_{3,1}$ | $I_1 \bowtie O_3$ |
| $Q_3$ | $O_3 \bowtie I_3$ |

Thus, the final query for $\beta_2$ has for its join expression: $Q(\Phi_2)$.join=join and $Q_{3,1}$.join and $Q_3$.join. Next is computed the union of the two query results to find the input events of $I_3$ that are responsible for the events in $O_1$. Since OP3 is the last operator in the data lineage paths, data lineage processing is complete.

Exemplary data lineage processing methods described involve retrieving input events identified by a corresponding unique identifier. This makes it possible to perform join operations very efficiently on small tables. However, in some embodiments data associated with each event is stored in a corresponding output log of each operator. Therefore, in some embodiments, event data is accessed by performing a supplementary join with the output log containing the corresponding generated events.

Several optimizations are possible in connection with the disclosed embodiments. For a source operator that is not a reader, if the sequence of generated events is stateful, an alternative option is to store on a durable storage the state of the process and recover it in case of failure of the process. If a process is a reader and the external system can replay an atomic read action on a past observable state, it is permissible to allow the output events of an atomic action to be logged and sent before the action is completed. The process only needs to keep a log of the atomic actions sent with the information relative to which part of the state has been observed. When the action is completed, the entire effect of the atomic action is logged. If a failure of the process occurs before an atomic action is completed, the process can recover its log of actions and resume the actions that are not completed. Furthermore, if a source process is a reader and it accesses an immutable state of an external system, the same technique can be applied.

A stateless operator reads an input event and processes it, which results in the generation of one or more output events. In this case, since the process has access to an associated event identifier and identifier of the port on which the event is received, the process can also obtain the connected output port identifier of the sender. Accordingly, the process can associate this information with each of the generated output events. In this case, an input log entry is not needed and associated writes to an input log can be avoided. Corresponding background tasks for garbage collection and associated recovery steps are adapted accordingly.

In various embodiments, logs may be merged for an arbitrary connection between two operators. Given reliable availability of centralized storage for logs, output and input logs may be merged for a single connection between operators. In the merged log, for each output event, a sender port identifier and a recipient port identifier of the connection is stored with a single status for the event that carries a value of "done" or "undone". Using merged logs, the above-described procedures function as previously explained. However, both the garbage collection and recovery protocols are simplified since no messages need to be exchange between processes. Instead, each process can access the shared log to decide when an event can be purged from the log and which events have to be replayed after recovery. For instance, the status of a new event is set initially to "undone" and is then changed to "done" when the event has been used to generate an output event on another connection. The background task simply removes "done" events.

Figure 7:
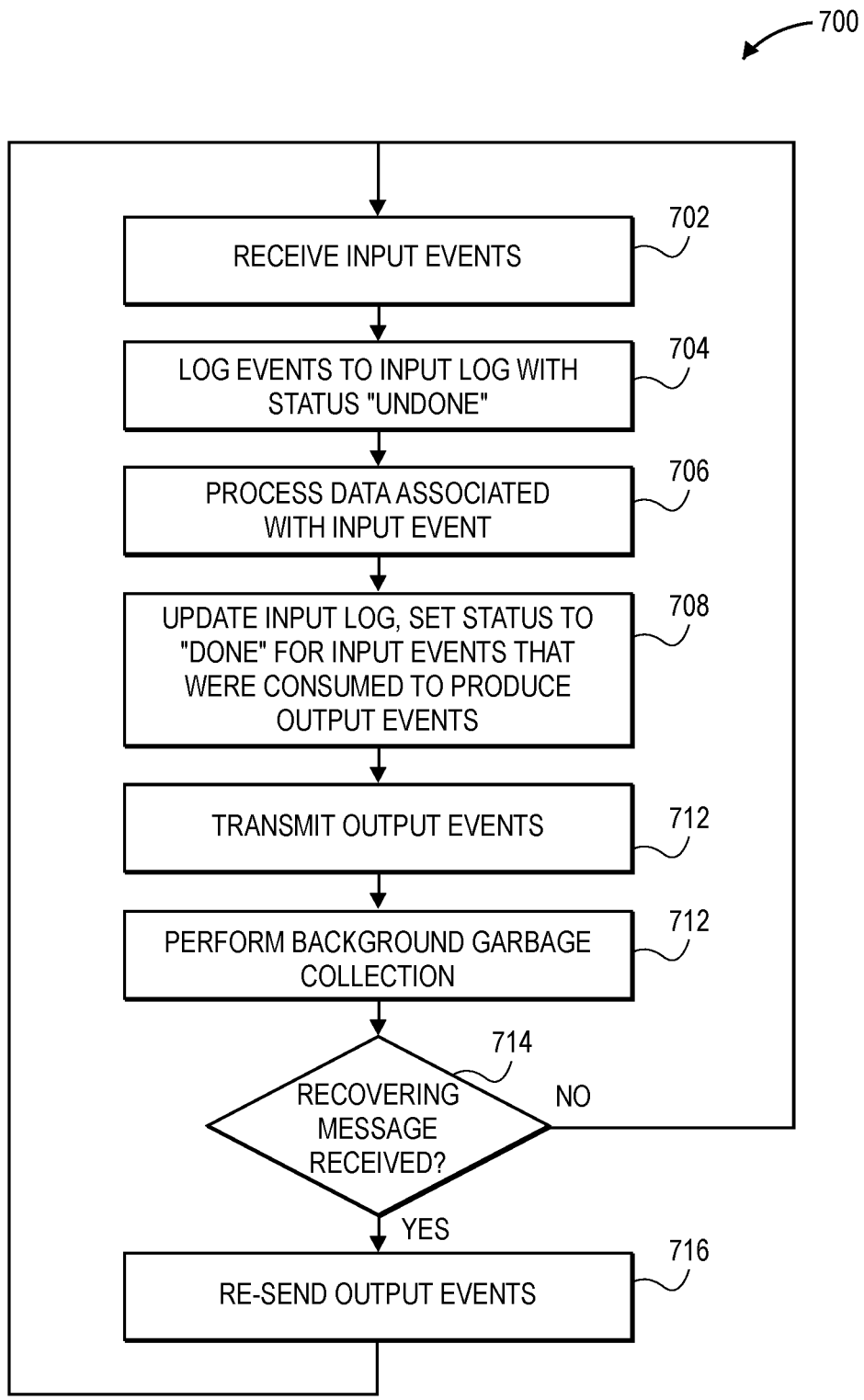
FIG. 7 depicts an exemplary flowchart illustrating the operation of a method in accordance with various embodiments.

FIG. 7 depicts an exemplary flowchart illustrating the operation of a method in accordance with various embodiments. At step 702, one or more input events are received from another process. In some embodiments, the input events are ingested by a source process by way of a read operation to an external input data source. In some embodiments, the external data source may be a data hub, a data mart, a data lake, a relational database server, or a database server that does not incorporate relational database principles. In these embodiments, if a source process is a reader that sends an atomic read action to an external system, it logs the effect of that atomic action in its output log with status "undone", before sending any of these output events to another process. If the logging cannot be successfully completed, then no event for that atomic read action is logged. If a source process is not a reader and the data generation process is stateless, no output event needs to be logged before sending the generated event. When a reader process sends an atomic read action, it logs the effect of the read action in its input log before any of the corresponding events are used to produce an output event on any of the reader's output port. If the logging is not successfully completed, no event for that atomic read action is logged.

Next, at step 704, information regarding one or more middle input events is logged to a middle operator input log associated with the middle operator, wherein the one or more middle input events are logged with an incomplete logging status designation. In some embodiments, when a process receives an event, the process logs the event with a status "undone" in the process's input log before processing the event. An optional pre-processing phase may be provided for assigning an input event to a "group" (e.g., a window) or computing an incremental state. If a "group" is assigned to an event, it may be updated in a corresponding input log. Next, at step 706, data associated with the one or more middle input events is processed according to operations associated with the operator.

Next, at step 708, one or more middle input log entries are updated, setting the one or more middle input log entries to a completed logging status designation corresponding to a consumed subset of the one or more middle input events that were consumed to produce one or more middle output events. In some embodiments, input events are processed in order using an associated sequence number. When output events are generated for one or more output ports, the process uses an atomic transaction to log associated output events to an output log with a status "undone" and set an associated log status to "done" for input events of the output log that were consumed to produce corresponding output events. When a writer process creates an atomic write action, it logs it in its output log when the action is complete, before sending it to the corresponding external system. After sending an atomic write action, if the action is successful then the status of the corresponding output event is set to "done". Otherwise, if the action fails before completion, the process must undo the write action, unless already committed by a corresponding external system and, attempt to carry out the action again. Next, at step 710, the one or more middle output events are transmitted to one or more subsequent operators.

Next, at step 712, background garbage collection is performed on the middle operator output log, wherein updated middle input log events that have been updated to reflect the completed logging status designation are removed from the middle operator output log. In some embodiments, background, asynchronous "garbage collection" tasks are executed as follows. A background task reads input logs and if an event has a status designated as "done," the background task sends an "ack" event to the event's sender with an identifier corresponding to the completed event. When a process receives an "ack" event from another process for a particular event identifier, it does the following. If the event identifier exists in a corresponding output log, the process sets the corresponding status to "done", otherwise process sends a "forget" event with the same event identifier to the process that sent the "ack" event. In some embodiments, another background task reads the output log and does the following: if an event has a status "done" then the task sends to the event's recipient a "forget" event with the event identifier and deletes the event from its output log. When a process receives a "forget" event for a particular event identifier, the process removes the event from the corresponding input log. Next, at test 714, if a recovering message from one or more subsequent operators is received corresponding output events received since the last completed log entry are transmitted. Finally, at step 716, resending corresponding middle output events that remain in the middle output log are re-sent as described in connection with FIG. 6 above.

Example Execution Environment

Pipeline engine embodiments may be employed in various execution environments. In one embodiment, an operator is implemented based on a runtime environment and respective libraries. For example, an operator executing Python code requires a Python interpreter and libraries. The runtime environment requirements are defined by an application container file and deployed an application execution environment such as a cloud-based serverless execution environment. Operator definitions, libraries, and application container files are stored in a repository. Tags are associated with operators and application container files, thereby establishing one or more dependencies: all required tags must be matched by one or more application container files to satisfy the associated dependencies.

At deployment time, operators in a pipeline are translated into threads that are either run individually or in so-called sub-engine processes. A sub-engine can interpret and execute a portion of a graph with its sub-engine-specific operators. Sub-engines have associated predefined tags. When a data pipeline is deployed, for each operator, an image composer searches for one or more suitable application container files that match the required tags of the operator. The image composer then automatically groups operators in such a way that each group of operators can be fulfilled by a single application container file. User-defined groups in the data pipeline are kept as such and an associated pipeline engine only checks that there exists one or more matching application container files for the group. The resulting application container files are then built and deployed on an a container execution environment such as Kubernetes, each group of operators being assigned to a different container and pod. Control events that change the status of the graph are communicated via NATs using a publisher-subscriber paradigm. For instance, when a graph needs to be stopped, a stop event is sent to all Kubernetes pods. Also, when an error causes some pod to fail, all other pods belonging to the same pipeline are notified of this event, which will trigger the graph stop.

Inside each pod, there exists a group manager process which is responsible for managing the lifecycle of its subgraph's operators and sub-engines. During the start of a graph, it needs to establish the connections between operators, run the initialization methods of them, and finally start them. The group manager process listens for stop events emitted by the API server, and it must publish a stop event for the other pods if one of its operators fails. The group manager is also responsible for serializing and deserializing the messages exchanged between different groups.

Data is transported from operator to operator in a generic message format, which can be refined by structured metadata descriptions. The transport medium can be in-process queues, or other low-level communication primitives depending on whether the message crosses sub-engine or group boundaries. In the latter case, they are serialized and delivered via inter-process communication when crossing sub-engines boundaries, or using an in-house messaging system, built on top of the TCP protocol, when crossing groups.

The pipeline engine (API server) keeps track of running graphs and stores metadata about them in a database instance. The pipeline engine is a user application, i.e., each user runs its own instance of the engine. Therefore, modification to artefacts in the repository can be executed in the scope of the user (i.e., without exposing the modification to other users in the pipeline execution environment).

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method for performing rollback recovery with data lineage capture for data pipelines, the method comprising:
    at a middle operator, receiving, from a source operator, one or more input events ingested by the source operator by way of a read operation to an external input data source;
    logging information regarding one or more middle input events to a middle operator input log associated with the middle operator, wherein the one or more middle input events are logged with an incomplete logging status designation;
    processing data associated with the one or more middle input events;
    updating one or more middle input log entries by setting the one or more middle input log entries to a completed logging status designation corresponding to a consumed subset of the one or more middle input events that were consumed to produce one or more middle output events;
    transmitting the one or more middle output events to one or more subsequent operators; and
    based on receiving a recovering message from one or more subsequent operators, resending corresponding middle output events from a middle operator output log.

2. The non-transitory computer-readable media of claim 1, the method further comprising:
    performing background garbage collection on the middle operator output log, wherein updated middle input log events that have been updated to reflect the completed logging status designation are removed from the middle operator output log.

3. The non-transitory computer-readable media of claim 1, the method further comprising:
    establishing one or more data lineage analysis start points and one or more data lineage analysis target points.

4. The non-transitory computer-readable media of claim 3, wherein the updating one or more middle input log entries by setting the one or more middle input log entries to a completed logging status designation comprises setting the one or more middle input log entries to a completed log preservation status designation.

5. The non-transitory computer-readable media of claim 2, wherein the performing background garbage collection on the middle operator output log comprises preserving the one or more middle input log entries having a completed log preservation status designation.

6. The non-transitory computer-readable media of claim 3, the method further comprising:
inserting a monitoring agent operator into the data pipeline to separate output events of data lineage interest from a remainder of output events; and
establishing the one or more data lineage analysis start points downstream from the inserted monitoring agent operator.

7. The non-transitory computer-readable media of claim 6, the method further comprising:
traversing the middle operator input log and the middle operator output log to identify intermediate input and output values at intermediate operators between the one or more data lineage analysis start points and the one or more data lineage analysis target points to determine initial values of the one or more data lineage analysis target points.

8. A method for performing rollback recovery with data lineage capture for data pipelines, the method comprising:
at a middle operator, receiving, from a source operator, one or more input events ingested by the source operator by way of a read operation to an external input data source;
logging information regarding one or more middle input events to a middle operator input log associated with the middle operator, wherein the one or more middle input events are logged with an incomplete logging status designation;
processing data associated with the one or more middle input events;
updating one or more middle input log entries by setting the one or more middle input log entries to a completed logging status designation corresponding to a consumed subset of the one or more middle input events that were consumed to produce one or more middle output events;
transmitting the one or more middle output events to one or more subsequent operators; and
based on receiving a recovering message from one or more subsequent operators, resending corresponding middle output events from a middle operator output log.

9. The method of claim 8, further comprising:
performing background garbage collection on the middle operator output log, wherein updated middle input log events that have been updated to reflect the completed logging status designation are removed from the middle operator output log.

10. The method of claim 8, the method further comprising:
establishing one or more data lineage analysis start points and one or more data lineage analysis target points.

11. The method of claim 10, wherein the updating one or more middle input log entries by setting the one or more middle input log entries to a completed logging status designation comprises setting the one or more middle input log entries to a completed log preservation status designation.

12. The method of claim 9, wherein the performing background garbage collection on the middle operator output log comprises preserving the one or more middle input log entries having a completed log preservation status designation.

13. The method of claim 10, the method further comprising:
inserting a monitoring agent operator into the data pipeline to separate output events of data lineage interest from a remainder of output events; and
establishing the one or more data lineage analysis start points downstream from the inserted monitoring agent operator.

14. The method of claim 13, the method further comprising:
traversing the middle operator input log and the middle operator output log to identify intermediate input and output values at intermediate operators between the one or more data lineage analysis start points and the one or more data lineage analysis target points to determine initial values of the one or more data lineage analysis target points.

15. A system comprising at least one processor and at least one non-transitory memory storing computer executable instructions that when executed by the processor cause the system to carry out actions comprising:
at a middle operator, receiving, from a source operator, one or more input events ingested by the source operator by way of a read operation to an external input data source;
logging information regarding one or more middle input events to a middle operator input log associated with the middle operator, wherein the one or more middle input events are logged with an incomplete logging status designation;
processing data associated with the one or more middle input events;
updating one or more middle input log entries by setting the one or more middle input log entries to a completed logging status designation corresponding to a consumed subset of the one or more middle input events that were consumed to produce one or more middle output events;
transmitting the one or more middle output events to one or more subsequent operators;
performing background garbage collection on a middle operator output log, wherein updated middle input log events that have been updated to reflect the completed logging status designation are removed from the middle operator output log; and
based on receiving a recovering message from one or more subsequent operators, resending corresponding middle output events from the middle operator output log.

16. The system of claim 15, wherein the middle operator input log and the middle operator output log are combined to form a middle operator merged log.

17. The system of claim 15, the actions further comprising:
establishing one or more data lineage analysis start points and one or more data lineage analysis target points.

18. The system of claim 17, wherein the updating one or more middle input log entries by setting the one or more middle input log entries to a completed logging status designation comprises setting the one or more middle input log entries to a completed log preservation status designation.

19. The system of claim 18, wherein the performing background garbage collection on the middle operator output log comprises preserving the one or more middle input log entries having a completed log preservation status designation.

20. The system of claim 17, the actions further comprising:
 inserting a monitoring agent operator into a data pipeline to separate output events of data lineage interest from a remainder of output events; and
 establishing the one or more data lineage analysis start points downstream from the inserted monitoring agent operator.

\* \* \* \* \*